United States Patent [19]
Voss

[11] 4,295,446
[45] Oct. 20, 1981

[54] COLLAPSIBLE SHELTER

[76] Inventor: Clifford C. Voss, 406 Donald Ave., Clawson, Mich. 48017

[21] Appl. No.: 121,265

[22] Filed: Feb. 13, 1980

[51] Int. Cl.³ .............................................. A01K 1/03
[52] U.S. Cl. .................................. 119/19; 229/23 BT
[58] Field of Search ................ 119/16, 19, 23; 220/8; 229/23 BT

[56] References Cited

U.S. PATENT DOCUMENTS

| | | | |
|---|---|---|---|
| 2,424,733 | 7/1947 | Benson | 119/23 |
| 3,355,087 | 11/1967 | Turnbull | 229/40 |
| 3,578,238 | 5/1971 | Schillinger et al. | 229/40 |
| 3,581,708 | 6/1971 | Beck et al. | 119/19 |
| 3,730,418 | 5/1973 | Spencer | 119/19 X |

Primary Examiner—Gene Mancene
Assistant Examiner—Robert P. Swiatek
Attorney, Agent, or Firm—Dale A. Winnie

[57] ABSTRACT

A readily collapsible and easily erected shelter construction including: a roof, side wall and floor providing part having the dimensional size and area of the roof panels equal to that of the side wall and floor panels for allowing flat folding of the roof panels over the side wall and floor panels, and end wall parts formed to fit and close the otherwise open ends of the first mentioned part and to hold the structure erected for use. The end walls being further preferably hinged to a floor or roof providing part and for being folded in together towards each other, and tied, to hold the structure flat folded for easier storage, handling, packaging and shipment.

5 Claims, 13 Drawing Figures

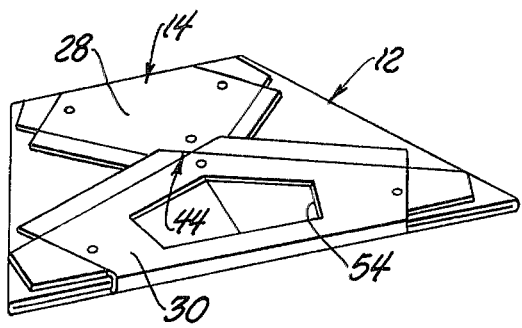
Fig. 4
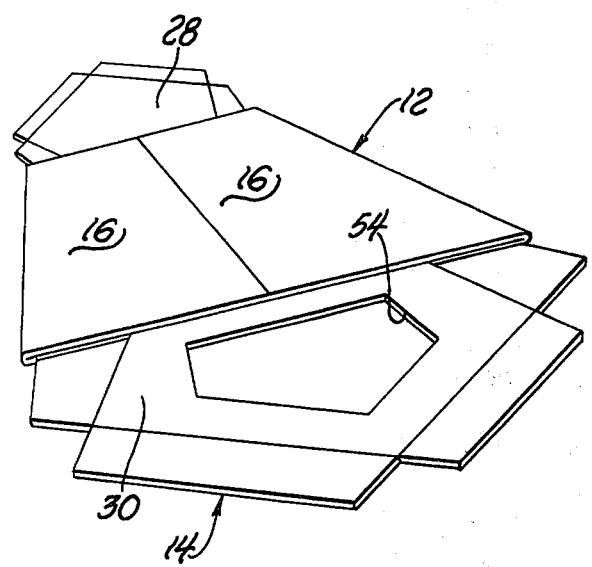
Fig. 5
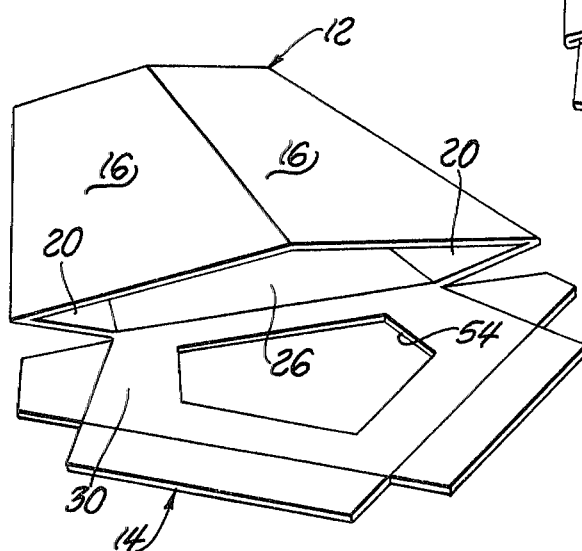
Fig. 6
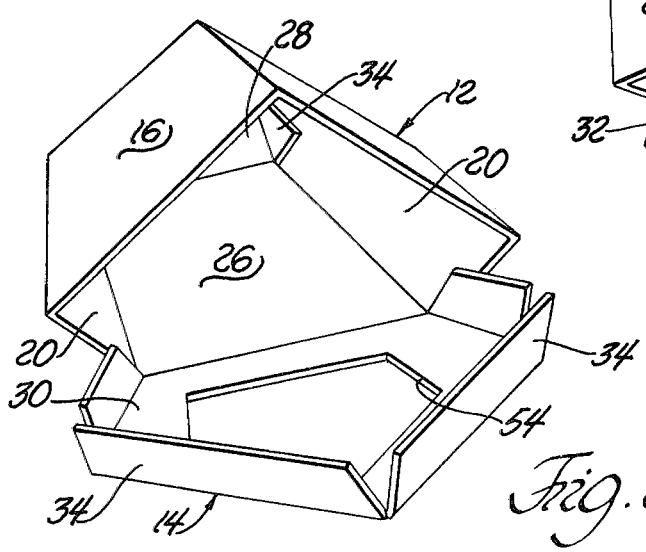
Fig. 7
Fig. 8

COLLAPSIBLE SHELTER

BACKGROUND OF THE INVENTION

There are a number of instances when having an easily collapsible and erectable shelter for small animals would be a great convenience.

For example, when traveling and vising friends or relatives, with a pet dog or cat, there are many times when the animal needs to be let out or left outdoors for a period of time. Although the animal can be stacked out on a leash or short chain, if the weather is hot or wet most pets and owners require some shelter to allow their pets to get out of the sun or rain showers.

When traveling in a motor home, and parked for an over-night stay, it would be nice to be able to let the family pet stay outside, on a leash or chain, if some temporary shelter were available.

At the beach, out camping, during pet shows, etc., are other instances that come to mind.

Then there is the unexpected guest with a pet, or the unexpected gift of a pet which requires some temporary shelter.

Although cardboard boxes and such have been placed into emergency service, for such uses as mentioned, they are seldom satisfactory or acceptable to either the pet lover or the animal. They are usually not of the right size, seldom are of waterproof construction, are too lightweight and easily moved or knocked over by the animal, are hard to tie or stake down, and are not collapsible and capable of reuse and familiarity for the animal.

Aside from pets and small animals, there is also a need for temporary and readily collapsible and portable shelters for use as beach cabanas, ice fishing shanties, backyard play houses and such that would be large enough to accommodate one or two people and which would provide protection from the weather and/or privacy, as and when needed.

In both instances, what is needed is a prefabricated structure, of inexpensive materials and construction, which can be readily put together and erected, and just as easily and conveniently taken down and collapsed, for storage and easier handling, and which is of sufficiently sturdy construction to withstand the elements, during high winds and storms, as well as rugged use, to allow its being erected, used and collapsed, again and again without appreciably diminished servicability for its intended purpose.

For animals, or small children, it must also be reasonably tight and sturdy in construction to withstand the carefree and sometimes devilish use that they often subject things to. Sloped rather than flat roofs are preferable, and tied rather than fitted parts are recommended, for example.

SUMMARY OF THE PRESENT INVENTION

This invention has as its principal goal and primary objective to provide just such a shelter.

For example, it is proposed to provide a shelter that may be made of inexpensive material, such as heavy paperboard, cardboard, or plastic sheeting, and which is or may be made waterproof, for greater resistance to weather conditions and/or whatever.

A one or two-piece construction is preferred and taught hereinafter which makes use of a wrap-around roof and side wall part, with opposite ends that fold in and under to provide a floor, and with front and back closure walls that fit in the otherwise open ends to close the ends and hold the structure erect.

Of particular significance and importance, is having the roof dimension and area equal to the sidewall or floor dimensions and area so that the structure may be folded flat.

The preferred form of the invention includes a first part, made of heavy duty cardboard, waxed or otherwise waterproofed for further durability, and which is rectangular in shape, as laid flat, and is scored across so that it may be bent and folded to provide outwardly and downwardly sloping roof sections, inwardly sloping sidewalls, and ends which will butt together to provide a floor. With the roof, sidewall and floor dimensions and area provided as aforesaid, this part may be folded flat upon itself with the roof providing sections overlying the sidewall and floor providing sections. and the ends of this "wrap-around" part may be butted and taped together.

A second part is made, of the same material, with a center section that is the same dimensional size as the floor area that is provided by the butted and taped ends of the wrap-around part. And, it has end wall parts that are formed and provided at each of its ends which are adapted to be folded and stand upright for closing the otherwise open ends of the wrap-around part, as assembled and used therewith.

One of the end wall parts will be appreciated as having an opening formed in it, to provide the accessway into the shelter that is formed. And both end wall parts are preferably formed to include tabs or flaps that will fold in and engage the roof and sidewall edges that they are received within.

For simplicity and expediency, simple button-and-string tie fasteners are used between the end wall parts and adjacent roof and sidewall ends, so that the parts can be readily fastened together, or loosened, in erecting or collapsing and folding the shelter down.

Proportionately, the end wall parts and their fold-in flaps are made no wider than the cross-sectional width of the roof sections, as folded flat, which is the same as for the sidewalls and floor area, so that the end wall parts may be folded over on the interconnecting floor part between them, and be conveniently stacked with the flat-folded wrap-around part.

It is also possible, as will be later shown and described, to make use of the tie fasteners to hold and retain the shelter in its flat-folded arrangement, for easier handling, shipment and/or storage so that no other case or packaging is needed.

A one-piece construction will also be shown and described, wherein the roof and sidewalls are similarly provided, by a wrap-around part, and where the end wall parts are hinged to part of the roof to fold down and inwardly in providing the closure members and parts that hold the structure erect and together at each end.

Further details of construction will also be described in the discussion which follows.

THE DRAWING FIGURES

FIG. 4 is a perspective view of the shelter shown in the first drawing figure as collapsed, folded and tied for storage and/or shipment.

FIG. 5 is a perspective view similar to the last drawing figure, with the end wall parts shown as folded outwardly.

FIGS. 6, 7 and 8 are perspective views similar to the previous two drawing figures and which progressively show the roof and sidewall part being opened, the end wall flaps being folded in, and the end wall parts readied for closing use.

DETAILED DESCRIPTION

Figure 1:
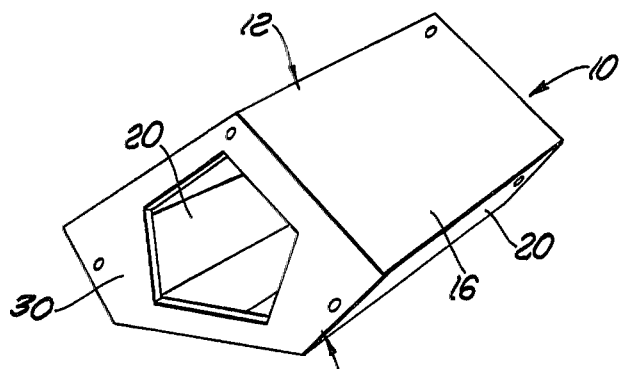
FIG. 1 is a perspective view of the collapsible shelter of the present invention, as designed for use by a small animal, such as a dog or cat, and which is shown erected and ready for use.
Figure 2:
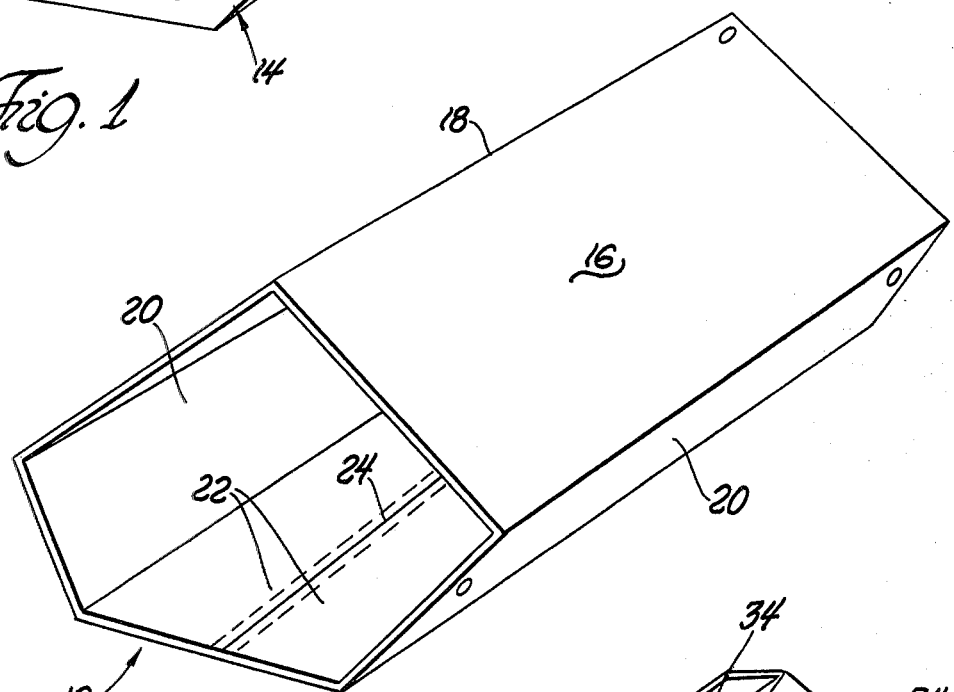
FIG. 2 is a perspective view of the roof and sidewall forming part of the structure, shown as opened up and with the opposite ends folded under and in, and taped together, to provide a base or under floor area.
Figure 3:
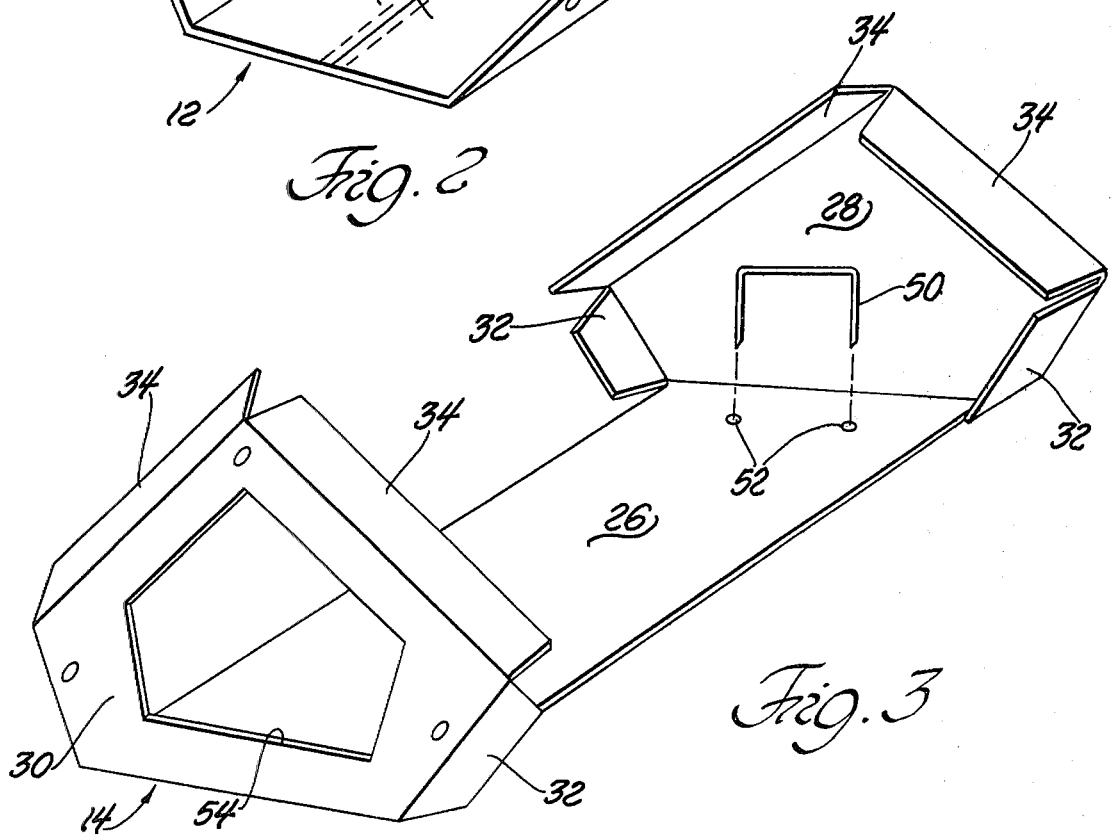
FIG. 3 is a perspective view of the end wall forming and providing part of the structure shown in the first drawing figure.

Although various forms of the present invention are conceivable, depending upon intended usage, the simplest and most easily understood form of the present invention is that of a small dog house, or "pup" tent, as is shown in the accompanying drawing figures.

The material used is a paperboard, or cardboard composition of reasonable strength and durability for its intended purpose, lightweight and made waterproof for outside use and further protection against wear and tear. Other materials may also be used, such as thin sheet plastic or fiberboard, with appropriately designed and applied hinging and seals, but for illustration purposes and basic simplicity and economy the cardboard composition materials have decided advantages.

Referring to the first three drawing figures, a fully assembled and erected structure 10 is shown in the first figure and it will be recognized and appreciated that this same structure is made up of the two parts or pieces 12 and 14 shown respectively in the second and third drawing figures.

The outer or shell part 12 is essentially rectangular in shape, when laid flat, in being cut and scored and it is formed to provide roof sections 16, that slope downwardly from a central apex 18, sidewalls 20 that slope inwardly and down, from the outer edges of the roof sections, and opposite ends 22 that are folded in and under to provide a base or under sub-floor for the assembled structure.

The two ends 22 of the wrap-around shell forming part 12 are butted together and taped, as at 24, shown in dotted outline in the second drawing figure.

The other part 14 of the structure, shown by the third drawing figure, and which fits in the shell, includes a floor area or section 26 of like size and dimension to that provided by the butted ends 22 of the wrap-around roof and sidewall forming part 12. And, it has end wall forming parts 28 and 30 at opposite ends thereof which are formed therewith and folded to stand in an upright position, as shown.

Each of the end wall parts 28 and 30 are formed to include tabs or flaps 32, along their respective sidewall engaging edges, and 34, along their roof engaging edges. And, these tabs or flaps 32 and 34 are folded inwardly, and are caused to enter and telescoope within the open ends of the wrap-around part 12 as the end wall closures are raised and brought into their closure positions.

As will be appreciated in looking at the size and dimensions of these flaps, in some of the other drawing figures, and particularly the sidewall flaps 32, they are formed to have a full length and reasonably wide surface area. Also, their respective ends are cut so that they will closely butt together and, in essence, without actually being joined, provide a right angle flange around the end walls that will serve to center them and also better hold the wrap-around part erected.

Figure 10:
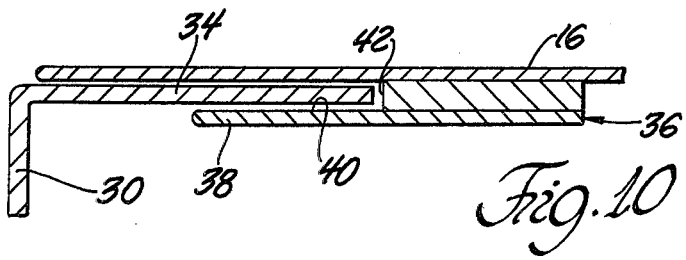
FIG. 10 is an enlarged cross-section of a corner part of one of the shelters (both having this same detail) showing the means used to receive, position and retain the in-bent flaps on the end wall closures.

To further assure obtaining this advantage, attention is directed to FIG. 10, wherein there is shown a stop and retainer part 36 that is glued to the inside of the roof and sidewalls near their outer edges. The retainer part 36 is formed to provide a lip 38, which is spaced from the underside of the roof, or inside of the sidewalls, sufficient to provide a space 40 within which such as the flap 34 may be received and closely held. It also provides a stop 42 that limits the extent to which the closure wall 30 can be moved into the open ends of the wrap-around shell part and assures that the end walls will be properly squared up and the whole structure held erect.

Figure 11:
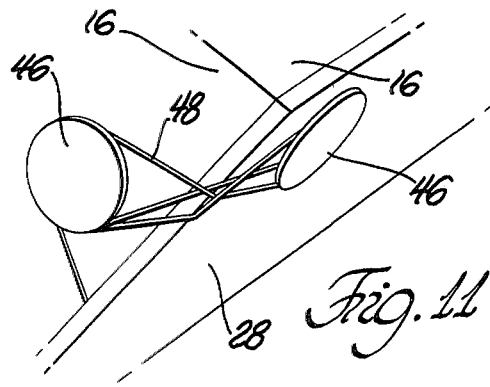
FIG. 11 is an enlarged perspective detail of the button-and-string tie fastener means used in the present invention.

In order to keep the end walls in position, and have them continue to hold the shell erect, button-and-string tie fasteners 44 are used, as best shown in FIG. 11. They include a pair of buttons 46, each of which is fastened to a different panel sufficiently near each other to allow a string 48, which is fastened to one of the panels, near one of the buttons, to be wrapped around both buttons and thereby hold and fasten the respective panels together. And, in turn, to hold together whatever the panels themselves may hold together.

In the present instance, buttons are provided on the end walls near the peak and at both side edges, and their respective mates are provided on the roof panels and the sidewalls, closely next adjacent and around the corners therefrom.

To fix or fasten the whole structure to the ground, in using it as an outside dog house, a relatively large wicket or staple-like member 50, made of wire rod or flat stock, with pointed ends, is positioned over a pair of holes 52 in the floor area 26 and pushed down through and into the ground. And like means, although not shown, are provided for the other end of the structure just inside the opening 54, which serves as the accessway, in the end wall 30.

From the preceding discussion, it will be appreciated that both the shell part 12 and the end wall part 14 are initially laid out, cut and scored for folding from flat stock material.

To facilitate erecting the shelter, and for greater convenience and simplicity during flat-folded storage, and- /or for shipment, the two parts 12 and 14 are folded together in a particular manner. First, the shell part 12 has its ends 22, and sidewalls 20, folded over on the roof sections 16. Then, before the ends 22 are taped, the end wall part 14 is positioned upside down with its floor part 26 on the roof panels, and its two-end wall parts 28 and 30 sticking beyond the ends of the roof panels. And then the two ends 22 of the shell part 12 are taped together.

The two parts 12 and 14 are then turned over and the end walls 28 and 30 are folded down together and towards each other, as best shown in FIG. 4. The peak or apex line 18 of the roof panels 16 can be seen through the door opening 54 in the nearest end panel 30.

To fasten and hold the flat parts together, the string tie and buttons 46, on the opposite end wall panels 28 and 30, are conveniently and purposely so located to serve such purpose.

The procedure for erecting the shelter structure is shown by the sequence of drawing FIGS. 4–8.

Beginning with FIG. 4, the tie fastener 44, holding the two end wall panels together, is undone and the end wall parts 28 and 30 are folded out flat as shown by FIG. 5.

The wrap-around shell part 12 is next opened, by pushing the outer edges of the roof panels 16 in towards each other, as shown in FIG. 6.

The next step, as shown in FIG. 7, is to fold in the end wall flaps 32 and 34. Then the shell part 12 is opened more, as shown in FIG. 8, and the end walls are raised so that the end wall flaps 32 and 34 are received within the open ends of the wrap around shell part until the end wall parts are in the closure positions.

The closure flaps 32 and 34 are received in the stop and retainer parts 36, as shown in FIG. 10, and the end walls are tied-off as by the tie fasteners 44 shown in FIG. 11.

Figure 12:
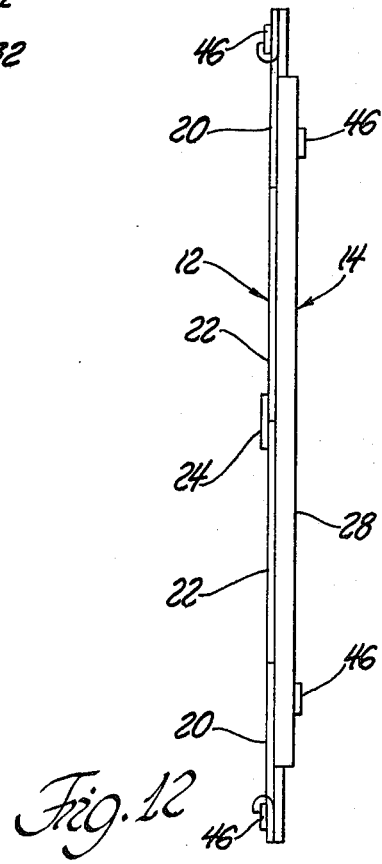
FIG. 12 is an end view of the shelter shown in the first drawing figures, as folded flat, interlocked and tied-off ready for storage or shipment.

The reverse procedure is used to collapse and fold-down the structure for storage; the flat folded assembly being shown in another view of FIG. 12.

Figure 9A:
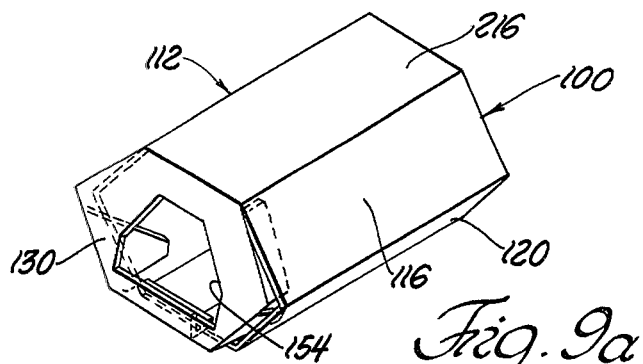
FIG. 9a is a perspective view of another form and embodiment of the present invention, again as designed for use by a small animal, such as a dog or cat, and which has its end walls hinged to part of the roof to swing downwardly and in for providing the closures.
Figure 9B:
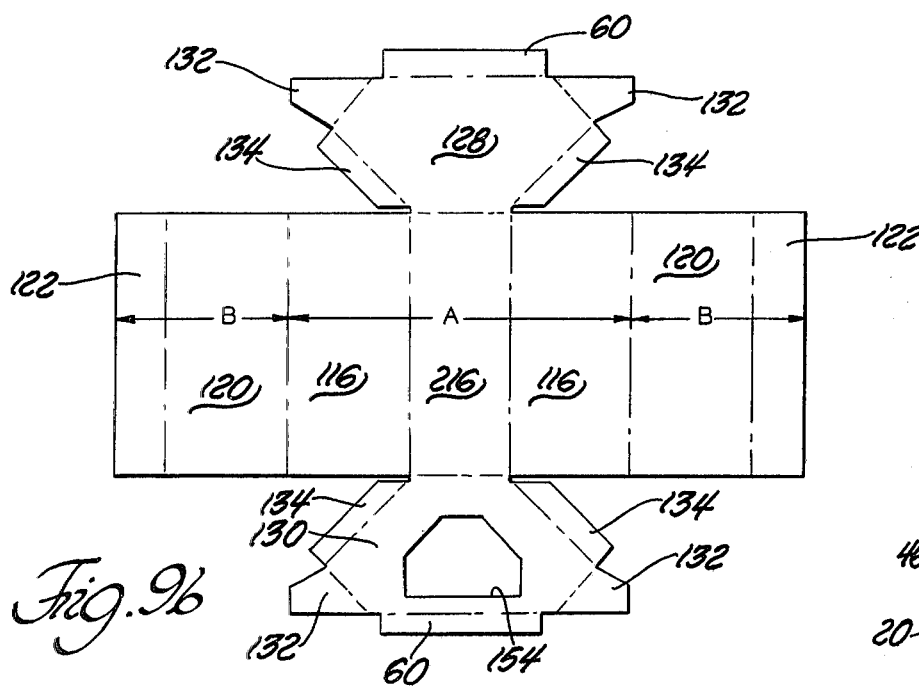
FIG. 9b is a plan view of the one-piece construction used to provide the shelter shown in the immediately preceding drawing figure, as laid open and flat.

Another variation, and a one-piece construction of the present invention, is shown by FIGS. 9a and 9b.

As appropriate, like or similar parts will be identified by the same reference numerals, with a distinguishing prefix, to enable a continuity of the discussion and description which has gone before and avoid needless duplication.

The erected shelter 100, shown by FIG. 9a, is generally similar to the first disclosed shelter 10, shown in FIG. 1, in having an end wall panel 130, with an opening 154, and in having the end wall panel received within and intended to close a wrap-around shell forming part 112, which is otherwise open at its opposite ends. The difference, however, is in the one-piece construction whereby the end wall panels 130 and 128 are connected and hinged to a center roof panel 216, between the outer disposed and downwardly sloping roof panels 116, on each side thereof. And, accordingly, in the different appearance presented by the different roof lines.

In other respects, the arrangement and construction is very similar: The combined span of the roof panels 116 and 216, shown by the dimension A, is equal to the combined width of the two sidewall panels 120 and the ends 122, which would be the dimension 2B. And the sidewall and roof line flaps 132 and 134 will be appreciated as the same.

The tie fasteners used are the same, except that one is provided at the lower edges of the end wall closures 128 and 130, rather than at the peaks, as in the first embodiment, since the hinge connection between the end walls and the shell body is reversed.

One other distinction is in having fold-in flaps 60 along the bottom edges of the end wall closures 128 and 130. This is desirable for added structural stability in the erected structure and is otherwise similar in having the in-bent flaps along all of the free edges of the closure panels just as in the other embodiment hereinbefore shown and described.

Although there will be a taped seam the length of the floor area, in this second shelter construction, a separate cardboard piece can be provided as an inner floor, or a blanket or rug piece can be used instead.

The one-piece structure is folded up for use, storage and shipment in a similar manner to the other structure, with the shell portion ends, inclusive of the sidewalls 120 and bottom wall parts 122, folded in and taped together, and the end wall closures 128 and 130 folded in towards each other, and tied off together.

The basic principal employed in both of the designs shown and described, and which is the premise in all other designs taught by the present invention, is the use of the trapezoidal base form. In having a base with sidewalls that extend upward and outward, to provide the trapezoidal base, and then downwardly sloping roof lines, dimensioned to match and correspond to the base and sidewall dimensions, a structure with extremely good structural integrity and aesthetic balance is provided which is not only sound and durable as erected, but capable of being flat-folded and self-retaining for easy storage, handling, packaging and shipment.

Without further discussion, it should be obvious that numerous variations, modifications and combinations are conceivable to obtain various types of structure and enclosures within the spirit and scope of the present invention. And, that while a couple of embodiments have been shown and described in some detail, this has been done for illustration purposes and is not to be viewed as limiting the scope of the present invention in any way. Rather, it is intended that the language of the hereinafter appended claims be given sufficiently broad interpretation to afford the protection that is due the present invention as an advance over the present and known state of the art.

I claim:
1. A collapsible shelter, comprising;
   a wrap-around roof and side wall forming part having the relatively opposite wrap-around ends thereof adapted to form and provide a floor area therefor,
   said wrap-around part being formed and dimensioned to have a roof area equivalent to that of the side walls and floor area together for allowing said roof, side wall and floor areas to be collapsed and folded flatly together,
   and end wall parts formed to fit and close the open ends of said first mentioned part, as erected, and to otherwise lie flatly thereon and therewith,
   said end wall parts being interconnected together and relatively spaced to be folded and fitted into the open ends of said first mentioned part, as erected, and to be folded flatly together, one over the other.
2. The collapsible shelter of claim 1,
   said end wall parts being interconnected by a secondary floor area part for overlying said first men- tioned floor area, as assembled and erected with said first mentioned part.

3. A collapsible shelter, comprising;

a wrap-around roof and side wall forming part having the relatively opposite wrap-around ends thereof adapted to form and provide a floor area therefor, said wrap-around part being formed and dimensioned to have a roof area equivalent to that of the side walls and floor area together for allowing said roof, side wall and floor areas to be collapsed and folded flatly together, and end wall parts formed to fit and close the open ends of said first mentioned part, as erected, and to otherwise lie flatly thereon and therewith, a one-piece floor area part of like size and dimension as said first mentioned floor area and having said end wall parts provided at relatively opposite ends thereof, said one-piece floor area part and end walls being of one piece waterproof paperboard construction, and said end walls having flaps along the roof and side wall engaging edges thereof for interlocking and fitted engagement therewith.

4. The collapsible shelter of claim 3, including;

means provided on said wrap-around part and on said end wall parts for relatively fixing and fastening said end wall parts in place and keeping said shelter erected.

5. The collapsible shelter of claim 4, said last mentioned means including individual fasteners readily engaged and disengaged for erecting and collapsing said shelter as and when desired.

* * * * *